United States Patent [19]
Driendl

[11] 3,869,908
[45] Mar. 11, 1975

[54] DEVICE FOR INDICATING THE STATIC DEFORMATION OF VEHICLE TIRES

[76] Inventor: Heinrich Driendl, 6175 Kematen/Tirol, Rauthweg, Austria

[22] Filed: Dec. 10, 1973

[21] Appl. No.: 423,490

[30] Foreign Application Priority Data
Dec. 13, 1972 Austria ............................ 10624/72

[52] U.S. Cl. ............................... 73/146.2, 116/34 A
[51] Int. Cl. ............................................ B60c 23/00
[58] Field of Search ......... 116/34 A; 73/146, 146.2, 73/146.3

[56] References Cited
FOREIGN PATENTS OR APPLICATIONS
568,395   1/1959   Canada .............................. 73/146.2

Primary Examiner—Donald O. Woodiel
Attorney, Agent, or Firm—John J. Dennemeyer

[57] ABSTRACT

A device for indicating the static deformation of vehicle tires comprises a pivotable sensor arm mounted on a shaft which carries a pivotable positioning arm, and a flexible non-stretching measuring strip which is extended between the free ends of the two arms. The sensor arm is connected to a control arm through a slipper clutch to move a pointer which indicates the deformation of the flexing area of the tire wall. A support arm is mounted on the device for engaging the rim edge of the tire and is adjustable in the longitudinal direction of the measuring strip.

8 Claims, 4 Drawing Figures

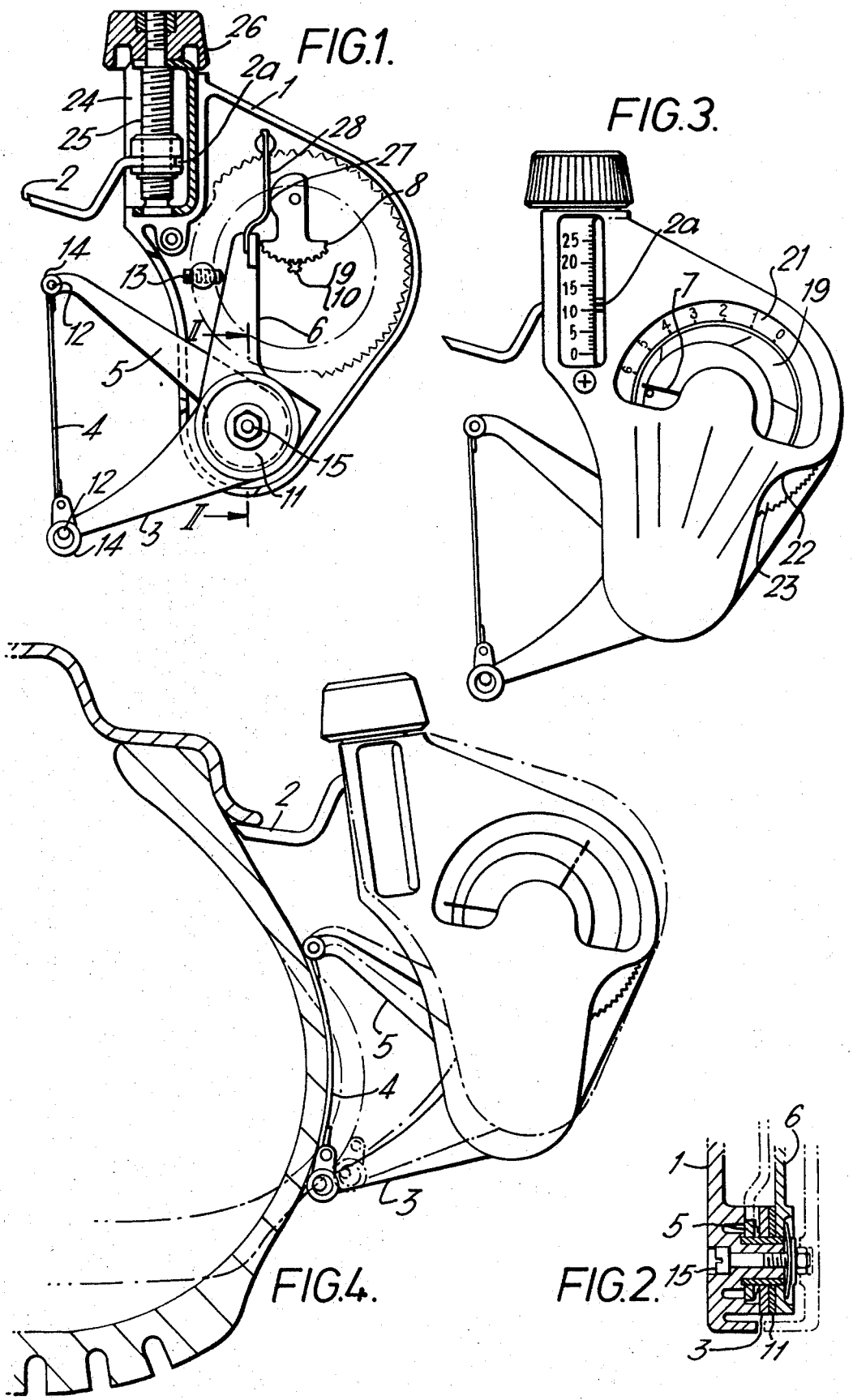

DEVICE FOR INDICATING THE STATIC DEFORMATION OF VEHICLE TIRES

The invention relates to a device for indicating the static deformation of vehicle tires as a function of the internal pressure and load, and comprises a pivotable sensor arm mounted on a shaft which carries a pivotable positioning arm. One end of a flexible but non-stretching measuring strip is fixed to the sensor arm and adapted to be placed against the tire side wall in the flexing area in order to measure the tire deformation and thus indicate the variations in the side wall deformation so as to be readable on a scale by means of a pointer or needle. The needle is adapted to be actuated by the movable sensor arm through a slipper clutch, and may be moved into a zero position prior to measuring.

Due to the loading of the tire, a form variation, respectively, a cross-section variation of the same, occurs in its load zone (flexing area), which variation, when measured with respect to the remaining zones of the tire, indicates the deformation by pressure and loading.

With the devices known prior to this invention it is, on the one hand, not possible to use them in a simple manner for a large number of tire types and, on the other hand, the difference of the form variation between the unloaded and the loaded zone cannot be exactly determined in a simple manner. If a motor vehicle is provided with four equal tires from the same production charge, a single adjustment of the device, respectively of the needle zero position, is sufficient, which in this case is then always nearly equal. However, this is very rarely the case. Generally the tires of a vehicle originate from different production charges, or the tires have a different operating life, so that due to the resulting stretching of the cord, altered tires of the same type are to be measured. Accordingly the device must be adjusted again to the zero position for each measuring of a tire because the resistance to bending of the tire material is different in each case. Furthermore the measuring of the spare tire is also important when it is mounted on the vehicle.

The driver must also take into consideration for his trip the conditions under which the tires have to operate, for example steady high speeds (highway) or normal traffic. The driver expects the needed performance from the tires, and therefore he should examine the operational safety of the tires.

The driving safety and the life of the tire depend upon the correct ratio of the tire loading to the air pressure. For all manipulations with the air pressure it must therefore be observed that a minimum air pressure is to be maintained for the shaft load. A few tenths of excess atmospheric pressure more or less in the vehicle tire completely change the driving attitude.

The correct ratio of the tire loading to the air pressure influences not only the load carrying capacity, but also the road holding capacity, the spring characteristics, the lateral stability and the driving comfort. Whether the driver actuates the accelerator pedal, the brake pedal or the steering, the road holding capacity of the tire determines whether the tire can execute positively the command of the driver. Also, a new tire is safe in operation, or can perform to its full capacity, only when its air-load ratio is correct. The most important measure for the traffic safety and simultaneously the most important maintenance means for the modern tires of today is a careful maintenance of the best possible ratio of the tire loading to the air pressure.

With the prior art device mentioned above, wherein the measuring strip was arranged between the movable sensor arm and the stationary support arm, it was possible to measure so far only a single tire size of one production type. Since each tire size has a different spring stroke characteristic and because also the production type must be considered, the device could not be utilized for other sizes. In view of the high number of tire sizes and production types this involved for the sale of the device high storage costs due to the large variety of tire products. In addition, the device could no longer be used by the driver when he changed to another tire size. Furthermore, with the known devices the driver could determine whether the tire had too much or too little air, but he had no measurement reference for this air pressure difference.

The object of the invention is to provide a device which may be used for a large number of tires of different sizes, types and production models, and wherein the air pressure difference for the respective driving conditions is readable in values of excess atmospheric pressure.

This is obtained according to the invention by the fact that the other end of the measuring strip is arranged in a manner known per se on a positioning arm, wherein the measuring strip extends only over the flexing area having the greatest deformation, and the positioning arm is pivotably mounted, preferably on the axis of the sensor arm, in a region between the axis of the sensor arm and the fixed support arm, and that the fixed support arm may be displaced and fixed in position on the housing independently of the measuring strip in the longitudinal direction thereof. The displaceable support arm permits a simple adjusting of the device to the given distance between the rim edge, against which the support arm is to be placed, and the flank region of the tire incorporating the flexing area, wherein the measuring strip extends only along the most deformed and determining zone of the tire flank. The pivotably mounted positioning arm insures a correct positioning of the measuring strip against the tire flank and permits for each deformation of the tire a constant length dimension (measured on the tire flank) between the pivotable sensor arm and the support arm. Due to the unvarying length of the measuring strip between the sensor arm and the positioning arm and due to the adjustability of the support arm, the portion of the tire flank immediately adjacent the rim edge is not considered during measuring because in this portion of the tire flank there is practically no deformation which is of any importance for the measuring. In addition, due to the separation of the mounting point of the measuring strip from the point of engagement of the support arm, the device of the invention may be adjusted in a very simple manner to the different tire sizes and types by displacing the support arm in the longitudinal direction of the measuring strip. The support arm is mounted preferably on a threaded spindle which, in combination with markings for the different tire types and production models arranged adjacent the threaded spindle, permits an easy adjustment of the device to the respective tire. Thus, it is possible to measure with a single length of measuring strip a plurality of tire sizes and types only by displacing the support arm.

In order to be able to determine with the device of the invention also the excess atmospheric pressure indications necessary for correcting the tire pressure in accordance with the load and for steady high speeds, according to a further feature of the invention, a pressure scale corresponding to the deformation scale is provided parallel to the deformation scale, and indicates the ratio of the tire loading to the air pressure in the tire, wherein the pressure scale is preferably displaceable with respect to the deformation scale. With this pressure scale it is possible, after having measured the actual deformation in the flexing area, and with knowledge of the air pressure existing in the tire, to read the necessary air pressure for the maximum operational safety of the tire.

According to a further feature of the invention a needle mechanism is provided between the control arm and the needle in order to obtain a greater transmission ratio. Thus it is possible to make small deformation differences in the flexing area already visible on the deformation scale and to thereby increase the measuring accuracy of the device. For an exact measuring it is often necessary to take several measurings in the region of the flexing area. Because one does not always measure exactly vertically below the wheel center point on the first try, it is appropriate to provide a drag pointer for the needle or the needle mechanism. This drag pointer indicates thus, in the case of several measurings, the maximum value of the respective deformation in the region of the flexing area. Preferably the needle or the needle mechanism is provided with a brake device which prevents an automatic return of the needle to the zero position.

The tires are often provided at the profile flanks with small beads or the like which interfere during the use of the device according to the invention with an easy rolling of the rollers mounted in a manner known per se at the sensor arm on a shaft, and thus falsify the measuring result. In order to avoid this and to overcome these obstacles easily, the inner diameter of the rollers is important, and it is preferably 1.5 times greater than the diameter of the shaft.

The invention will now be described by referring to an embodiment shown in the accompanying drawings, wherein:

FIG. 1 shows the device of the invention in cross-section,

FIG. 2 is a section according to line II—II of FIG. 1,

FIG. 3 shows a front view of the device, and

FIG. 4 shows the device positioned against an unloaded or a loaded tire.

According to FIG. 1, the device consists of a housing 1, a support arm 2 which is to be placed against the rim edge to take a measurement, a pivotable sensor arm 3, a pivotable positioning arm 5, a measuring strip 4 arranged between the two arms 3 and 5 and adapted to be placed against the tire flank incorporating the flexing area, and a control arm 6 which displaces a needle 7 through a gear segment 8 and a pinion 10 provided on the pointer shaft 9. The sensor arm 3 is coupled by means of a clutch 11, preferably a slipper clutch, arranged in the housing 1, to the control arm 6 actuating the needle 7, wherein the pivot range of the sensor arm 3 is greater than that of the control arm 6 which engages in the zero position of the needle 7 an adjustable stop 13 provided in the housing 1.

The axis of the slipper clutch 11 and the axis 9 of the needle 7 are positioned in two planes substantially parallel to the straight measuring strip 4, and the plane of the slipper clutch axis is located closer to the measuring strip 4.

The deformation scale may be provided in white, yellow, green and red colored fields with the corresponding indications such as "too much air," "highway," "normal drive," "too little air" or the like relative to these colored fields.

Parallel to this deformation scale 19 a pressure scale 21 may be provided which is displaceable in guides 20. The pressure scale is displaceable by means of a knurled ring 23 extending through a slot 22 of the housing 1.

The support arm 2 to be placed against the edge rim independantly of the measuring strip is movable in a slot guide 24 of the housing by means of a threaded spindle 25 extending through the support arm and rotatably mounted in the housing. The threaded spindle 25 is provided at its end opposite the measuring strip 4 with a turning knob 26. The support arm 2 has a marking 2a which cooperates with a type scale arranged along the slot guide 24 for the different tire sizes and production types.

The needle mechanism 8, 10 is provided with a brake device in the form of a spring 28 which engages a circular projection 27 concentric to the point of rotation of the gear segment 8, when the gear segment is pivoted by the control lever 6. The spring 28 grips with its curved end behind the control lever 6 and is moved by the control lever 6 away from the projection 27 of the gear segment 8 when this lever engages the adjusting screw, so that the needle returns to its zero position determined by the needle mechanism 8, 10.

At the free end of the sensor arm or the positioning arm, rollers 14 are provided on a shaft 12 retaining also the measuring strip 4, and the inner diameter of these rollers is substantially larger, preferably 1.5 times larger than the diameter of the shaft 12.

The device of the invention is utilized in such a manner, that the marking 2a of the support arm 2 is first brought into alignment with the marking on the type scale associated with the size and production type of the tire to be measured, then the pointer 7 is moved into the position opposite the zero by moving the positioning arm or the sensor arm toward each other, whereby the sensor arm 3 is pivoted by the slipper clutch 11 moved beyond this position corresponding to the pointer position. The device is then placed out of the ground engaging zone of the tire, for example at the height of the axis, the support arm 2 engaging the rim edge, and then the measuring strip 4 is placed against the tire flank whereby the needle returns due to its small pivot movement and the slipper clutch against the stop of the zero position.

If the device is then placed in the ground engaging zone of the tire with the support arm 2 resting against the rim edge of the tire and the measuring strip placed against the flexing area, and starting from the zero position of the needle, the exact condition of the tire with reference to its suitable operational properties in the form of limit indications of the scales is determined.

Thus according to the invention, the indication of the deformation due to the tire pressure and the tire loading is always established from the zero position of the needle on the tire itself, so that eventual deformations of the tire due to its aging are taken into consideration.

If, for a measured tire also for example, the correct excess atmospheric pressure number should be determined due to insufficient air presure, it is necessary to measure first the air pressure existing in the tire. Then the air pressure scale is displaced so that the measured value on the scale corresponds to the pointer deflection. Thereafter one may read on the air pressure scale above the corresponding fields of the deformation scale that particular air pressure which is required for driving on ordinary roads or on highways.

Instead of the absolute excess atmospheric pressure indication on the air pressure scale it is also possible that only the pressure differences appear on this scale. In that case, the air pressure scale must be brought into alignment at its zero point with the needle. Thereafter the difference in pressure which should be added or released can be read in connection with the zones of the deformation scale.

Instead of the threaded spindle for adjusting the support arm 2, also a pin may be utilized on which the support arm may be moved and fixed in position by means of a clamp screw.

What is claimed is:

1. Device for indicating the static deformation of vehicle tires as a function of the internal pressure and load of the tire comprising a housing carrying a fixed support arm and a pivotable sensor arm, a flexible, non-stretching measuring strip connected at one end to the sensor arm and adapted to be placed against the tire side wall in the flexing area for measuring the tire deformation to indicate a variation of the deformation to be readable by means of a needle on a scale, wherein the needle is adapted to be actuated by the movable sensor arm and a control arm coupled to the sensor arm by means of a slipper clutch and movable into its zero position before measuring the improvement consisting in that the other end of the measuring band (4) is arranged on a positioning arm (5) in a manner known per se, said measuring strip extending over the flexing area only in the region of the greatest deformation, said positioning arm (5) being pivotably mounted, preferably on the shaft (15) of said sensor arm (3) in the region between the shaft (15) of said sensor arm (3) and the fixed support arm (2), and that the fixed support arm (2) is mounted for adjustment and locking on the housing (1) independently of the measuring strip in its longitudinal direction.

2. Device according to claim 1, wherein the support arm (2) is mounted on a threaded spindle (25).

3. Device according to claim 2, wherein parallel to the deformation scale (19) a pressure scale (21) corresponding to the deformation scale is provided, said pressure scale indicating the ratio of the tire loading to the air pressure in the tire.

4. Device according to claim 3, wherein the pressure scale (21) is adjustable with respect to the deformation scale (19).

5. Device according to claim 1, wherein a needle mechanism (8, 10) is provided between the control arm (6) and the needle (7) to obtain a greater transmission ratio.

6. Device according to claim 5, wherein the needle (7) or the needle mechanism (8, 10) is provided with a drag pointer.

7. Device according to claim 5, wherein the needle (7) or the needle mechanism (8, 10) is provided with a brake device, for example a spring (28), preventing an automatic return of the needle (7) to the zero position.

8. Device according to claim 1, wherein the inner diameter of rollers (14) mounted in a manner known per se on a shaft (12) at the free end of the sensor arm or the positioning arm (3, 5) is substantially larger, preferably 1.5 times larger than the diameter of the shaft (12).

* * * * *